US012725272B2

(12) United States Patent
Hori

(10) Patent No.: US 12,725,272 B2
(45) Date of Patent: Sep. 1, 2026

(54) NON-TRANSITORY COMPUTER READABLE MEDIUM AND COMMUNICATION METHOD FOR PRESENTATION OF OBJECTS OVER A NETWORK

(71) Applicant: TOYOTA JIDOSHA KABUSHIKI KAISHA, Toyota (JP)

(72) Inventor: Tatsuro Hori, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 18/318,276

(22) Filed: May 16, 2023

(65) Prior Publication Data

US 2023/0377166 A1 Nov. 23, 2023

(30) Foreign Application Priority Data

May 17, 2022 (JP) ................................ 2022-081180

(51) Int. Cl.

| | |
|---|---|
| ***G06T 7/194*** | (2017.01) |
| ***G06F 3/01*** | (2006.01) |
| ***G06T 15/00*** | (2011.01) |
| ***G06V 10/24*** | (2022.01) |
| ***G06V 40/20*** | (2022.01) |

(52) U.S. Cl.
CPC .............. *G06T 7/194* (2017.01); *G06F 3/013* (2013.01); *G06T 15/00* (2013.01); *G06V 10/242* (2022.01); *G06V 40/28* (2022.01); *G06V 2201/07* (2022.01)

(58) Field of Classification Search
CPC . G06T 7/194; G06T 15/00; G06T 7/11; G06F 3/013; G06V 10/242; G06V 40/28; G06V 2201/07; G06V 20/64; G06V 40/18; H04N 7/147; H04N 21/42203; H04N 21/4223; H04N 21/4394; H04N 21/44008;

(Continued)

(56) References Cited

U.S. PATENT DOCUMENTS 5,778,177 A * 7/1998 Azar ...................... H04N 7/142
709/202
6,072,907 A * 6/2000 Taylor ..................... G06T 7/136
358/1.9

(Continued)

FOREIGN PATENT DOCUMENTS

JP 2004-171356 A 6/2004
JP 2012-79167 A 4/2012

(Continued)

OTHER PUBLICATIONS

"Method and system for tracking the focus area of a presenter and displaying the same during video conference," https://priorart.ip.com//IPCOM/000252958, IP.Com No. IPCOM000252958D, Feb. 23, 2018. (Year: 2018).*

*Primary Examiner* — Kathleen Y Dulaney
(74) *Attorney, Agent, or Firm* — Sughrue Mion, PLLC

(57) ABSTRACT

A program is configured to cause a computer to execute operations, the computer being configured to remove a background from a first image captured in a first space in which a first user is located to generate a second image to be displayed to a second user in a second space that is separate from the first space, the operations including scanning an object in the first space upon detecting a cue from the first user, and transmitting an image of the scanned object together with the second image via a network.

11 Claims, 7 Drawing Sheets

(58) Field of Classification Search
CPC ........... H04N 21/4728; H04N 21/4788; H04N 5/272; H04N 7/15
USPC ............... 382/173, 103; 348/14.08; 370/260; 715/753
See application file for complete search history.

(56) References Cited

U.S. PATENT DOCUMENTS 6,909,451 B1* 6/2005 Latypov ............. H04N 21/4788 348/14.07
11,652,958 B1* 5/2023 Geddes ................ H04N 21/631 348/14.09
11,758,083 B1* 9/2023 Kumar Agrawal .. H04N 5/2628 348/14.08
11,805,157 B2* 10/2023 Gronau .................. H04N 7/144
11,849,257 B2* 12/2023 Pitts .................... H04L 12/1822
2005/0078871 A1* 4/2005 Pollard .............. H04N 1/19594 382/202
2005/0093971 A1* 5/2005 Ono ......................... H04N 7/15 348/14.09
2008/0170776 A1* 7/2008 Albertson .............. G06V 40/28 382/154
2008/0181140 A1* 7/2008 Bangor ................. H04L 65/403 370/261
2010/0103242 A1* 4/2010 Linaker .............. H04N 7/17318 348/14.02
2010/0220897 A1* 9/2010 Ueno ....................... H04N 7/15 382/115
2012/0026277 A1* 2/2012 Malzbender ........... H04N 7/147 348/E7.083
2012/0050587 A1* 3/2012 Yamamoto ............. H04N 23/61 348/262
2012/0216129 A1* 8/2012 Ng ......................... G06Q 10/00 715/753
2012/0218373 A1* 8/2012 N'guessan ............... H04N 7/15 348/E7.083
2013/0057641 A1* 3/2013 Wada ................... G06V 40/107 348/E7.083
2014/0232814 A1* 8/2014 Malhotra ................. H04N 7/15 348/14.07
2015/0201162 A1* 7/2015 Griffin ..................... H04N 7/15 348/14.07
2015/0248167 A1* 9/2015 Turbell ................. G06F 3/0481 715/754
2017/0310920 A1 10/2017 Chiu et al.
2020/0186727 A1 6/2020 Denoue et al.
2021/0006749 A1* 1/2021 Koike ................... G06F 3/1454
2021/0105437 A1 4/2021 Terada et al.
2021/0208687 A1* 7/2021 Koike .................... H04N 7/147
2022/0019296 A1* 1/2022 McCain ................. H04N 7/185
2022/0076612 A1* 3/2022 Nagao ...................... G09G 3/20
2022/0321831 A1* 10/2022 Li ........................ G06K 7/1417
2022/0335620 A1* 10/2022 Ostap ........................ G06T 5/94
2023/0112542 A1* 4/2023 Chen .................. G01B 11/2545 382/154
2023/0262101 A1* 8/2023 Desai .................. H04L 65/1089 348/14.03
2023/0298143 A1* 9/2023 Nicholson ................. G06T 5/77 382/103
2023/0319120 A1* 10/2023 Doken ................ H04L 65/1089 348/14.02
2023/0328196 A1* 10/2023 Seoc .................... H04N 5/2624
2024/0259525 A1* 8/2024 Zhang .................... H04N 7/147

FOREIGN PATENT DOCUMENTS

JP 2012-169694 A 9/2012
JP 2015-115723 A 6/2015
JP 2017-194944 A 10/2017
JP 2020-92424 A 6/2020
JP 2021-61527 A 4/2021
JP 2021-141346 A 9/2021
WO 2012/046432 A1 4/2012
WO 2018/074262 A1 4/2018
WO 2019/187747 A1 10/2019

* cited by examiner

10
SERVER APPARATUS
20
50
SECOND TERMINAL APPARATUS
40
CONTROLLER
41
MEMORY
42
COMMUNICATION INTERFACE
43
INPUT INTERFACE
44
OUTPUT INTERFACE
45
FIRST TERMINAL APPARATUS
30
CONTROLLER
31
MEMORY
32
COMMUNICATION INTERFACE
33
INPUT INTERFACE
34
OUTPUT INTERFACE
35

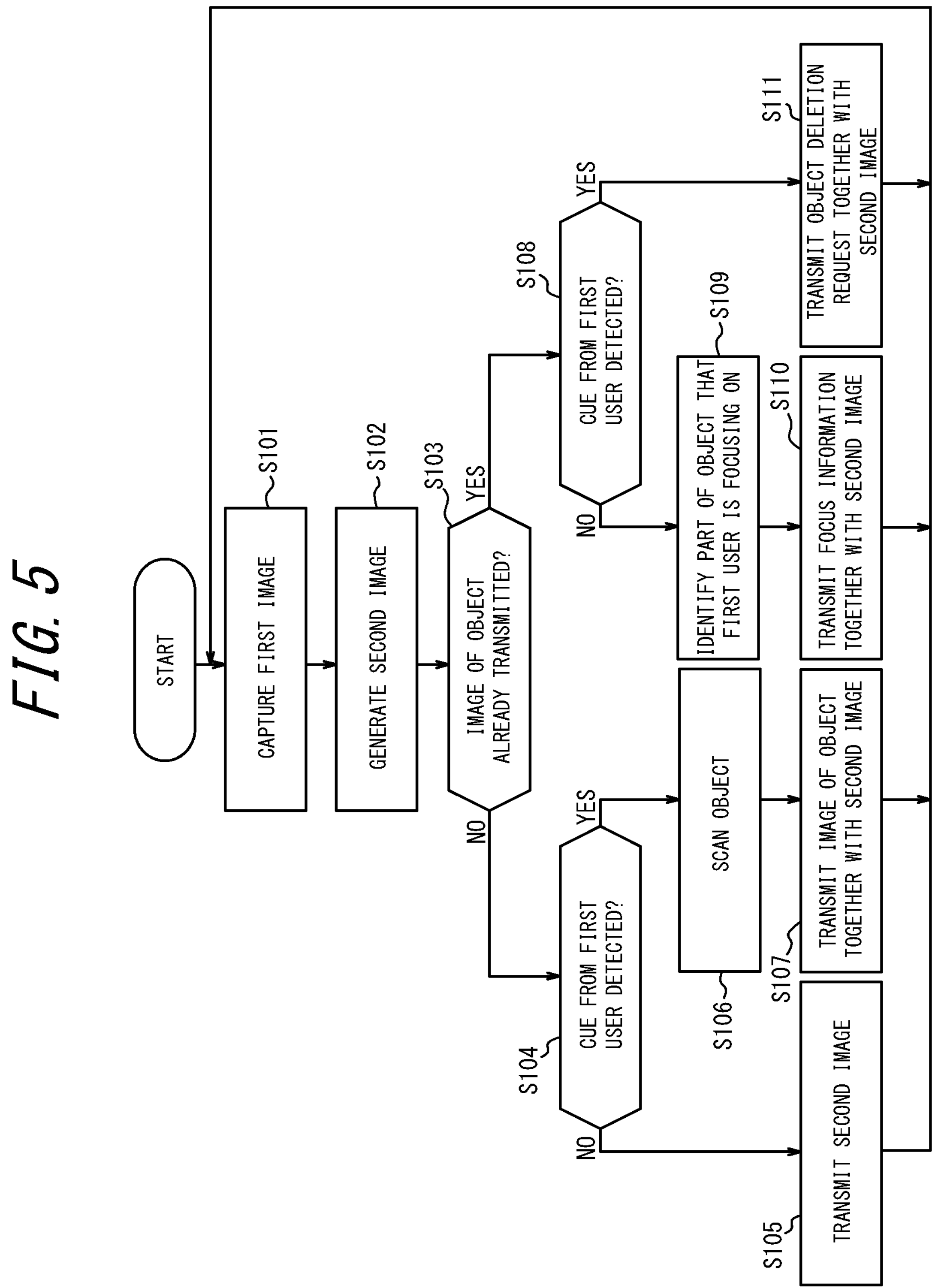
FIG. 5
START
CAPTURE FIRST IMAGE
S101
GENERATE SECOND IMAGE
S102
IMAGE OF OBJECT ALREADY TRANSMITTED?
S103
YES
NO
CUE FROM FIRST USER DETECTED?
S104
NO
YES
TRANSMIT SECOND IMAGE
S105
SCAN OBJECT
S106
TRANSMIT IMAGE OF OBJECT TOGETHER WITH SECOND IMAGE
S107
CUE FROM FIRST USER DETECTED?
S108
NO
YES
IDENTIFY PART OF OBJECT THAT FIRST USER IS FOCUSING ON
S109
TRANSMIT FOCUS INFORMATION TOGETHER WITH SECOND IMAGE
S110
TRANSMIT OBJECT DELETION REQUEST TOGETHER WITH SECOND IMAGE
S111

START
RECEIVE SECOND IMAGE
S201
IMAGE OF OBJECT ALREADY RECEIVED?
S202
NO
YES
S203
IMAGE OF OBJECT RECEIVED?
NO
YES
S206
OBJECT DELETION REQUEST RECEIVED?
NO
YES
DISPLAY IMAGE OF OBJECT TOGETHER WITH SECOND IMAGE TO SECOND USER
S207
DISPLAY SECOND IMAGE TO SECOND USER
S204
DISPLAY IMAGE OF OBJECT TOGETHER WITH SECOND IMAGE TO SECOND USER
S205
DISPLAY MARK ON IMAGE OF OBJECT
S208

START
RECEIVE SECOND IMAGE
S211
S212
IMAGE OF OBJECT ALREADY RECEIVED?
NO
YES
S213
IMAGE OF OBJECT RECEIVED?
NO
YES
S216
OBJECT DELETION REQUEST RECEIVED?
NO
YES
DISPLAY IMAGE OF OBJECT TOGETHER WITH SECOND IMAGE TO SECOND USER
S217
DISPLAY SECOND IMAGE TO SECOND USER
S214
DISPLAY IMAGE OF OBJECT TOGETHER WITH SECOND IMAGE TO SECOND USER
S215
ROTATE OR MOVE IMAGE OF OBJECT
S218

NON-TRANSITORY COMPUTER READABLE MEDIUM AND COMMUNICATION METHOD FOR PRESENTATION OF OBJECTS OVER A NETWORK

CROSS-REFERENCE TO RELATED APPLICATION

This application claims priority to Japanese Patent Application No. 2022-081180 filed on May 17, 2022, the entire contents of which are incorporated herein by reference.

TECHNICAL FIELD

The present disclosure relates to a program and a communication method.

BACKGROUND

Patent Literature (PTL) 1 discloses a system that extracts the background in a videoconferencing stream, separates the background from the user, and replaces the separated background with a background received from another user's system or a pre-registered background.

In the system disclosed in PTL 2, a first terminal transmits a moving image captured by a camera to a second terminal. The second terminal displays the received moving image on a display and has a user write an instruction for the moving image. The second terminal transmits, to the first terminal, an image of the written instruction and a still image obtained by trimming the moving image over a range corresponding to the image of the instruction. The first terminal extracts the portion of the moving image, captured by the camera, that matches the received still image while performing a projective transformation or orientation transformation on the still image. The first terminal displays, on a display, a moving image yielded by superimposing an image of the instruction subjected to the same projective transformation or orientation transformation as the still image on the extracted portion.

CITATION LIST

Patent Literature

PTL 1: JP 2020-092424 A
PTL 2: JP 2015-115723 A

SUMMARY

In conventional systems, when a user tries to show an object in front of the user to other parties in a videoconference, the object might be considered part of the background and removed.

It would be helpful to enable a user to show an object in front of the user to the other party while communicating by video, even when a background removal function is enabled.

A program according to the present disclosure is configured to cause a computer to execute operations, the computer being configured to remove a background from a first image captured in a first space in which a first user is located to generate a second image to be displayed to a second user in a second space that is separate from the first space, the operations including:

scanning an object in the first space upon detecting a cue from the first user; and transmitting an image of the scanned object together with the second image via a network.

Another program according to the present disclosure is configured to cause a computer to execute operations including:

receiving, via a network, an image of an object scanned by a terminal apparatus together with a second image, the terminal apparatus being configured to remove a background from a first image captured in a first space in which a first user is located to generate the second image and to scan the object in the first space upon detecting a cue from the first user; and displaying the received image of the object together with the second image to a second user in a second space that is separate from the first space.

A communication method according to the present disclosure includes:

scanning, by a terminal apparatus configured to remove a background from a first image captured in a first space in which a first user is located to generate a second image to be displayed to a second user in a second space that is separate from the first space, an object in the first space upon detecting a cue from the first user; and transmitting, from the terminal apparatus, an image of the scanned object together with the second image via a network.

According to the present disclosure, a user can show an object in front of the user to the other party while communicating by video, even when a background removal function is enabled.

BRIEF DESCRIPTION OF THE DRAWINGS

In the accompanying drawings:

FIG. 5 is a flowchart illustrating operations of a first terminal apparatus according to the embodiment of the present disclosure;

DETAILED DESCRIPTION

Figure 1:
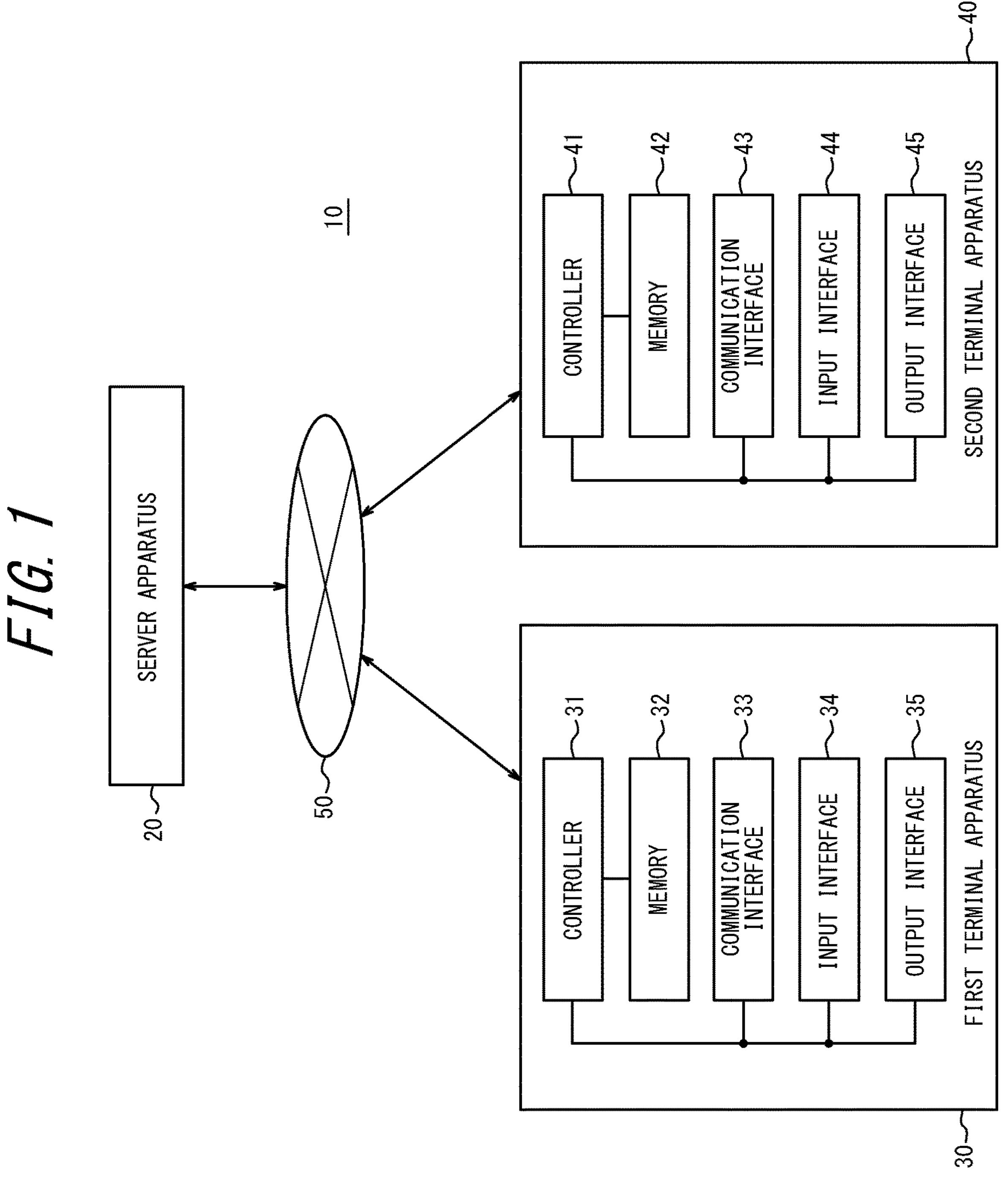
FIG. 1 is a block diagram illustrating a configuration of a communication system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a communication system 10 according to the present embodiment will be described with reference to FIGS. 1 to 3.

The communication system 10 includes a server apparatus 20, a first terminal apparatus 30, and a second terminal apparatus 40. The server apparatus 20 can communicate with the first terminal apparatus 30 and the second terminal apparatus 40 via a network 50. The first terminal apparatus 30 may be able to communicate with the second terminal apparatus 40 via the network 50.

The server apparatus 20 is installed in a facility such as a data center and operated by a service provider. The server apparatus 20 is a server computer that belongs to a cloud computing system or another type of computing system.

The first terminal apparatus 30 is installed in a first space 11 in which a first user 13 is located and is used by the first user 13. The first space 11 is, for example, the home or office of the first user 13. The first terminal apparatus 30 is, for example, a general purpose computer such as a PC, a dedicated computer specialized for particular calculations, or a mobile device such as a mobile phone, smartphone, or tablet. The term "PC" is an abbreviation of personal computer.

The second terminal apparatus 40 is installed in a second space 12, separate from the first space 11, in which a second user 14 is located and is used by the second user 14. The second space 12 is, for example, the home or office of the second user 14. The second terminal apparatus 40 is, for example, a general purpose computer such as a PC, a dedicated computer specialized for particular calculations, or a mobile device such as a mobile phone, smartphone, or tablet.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

Figure 2:
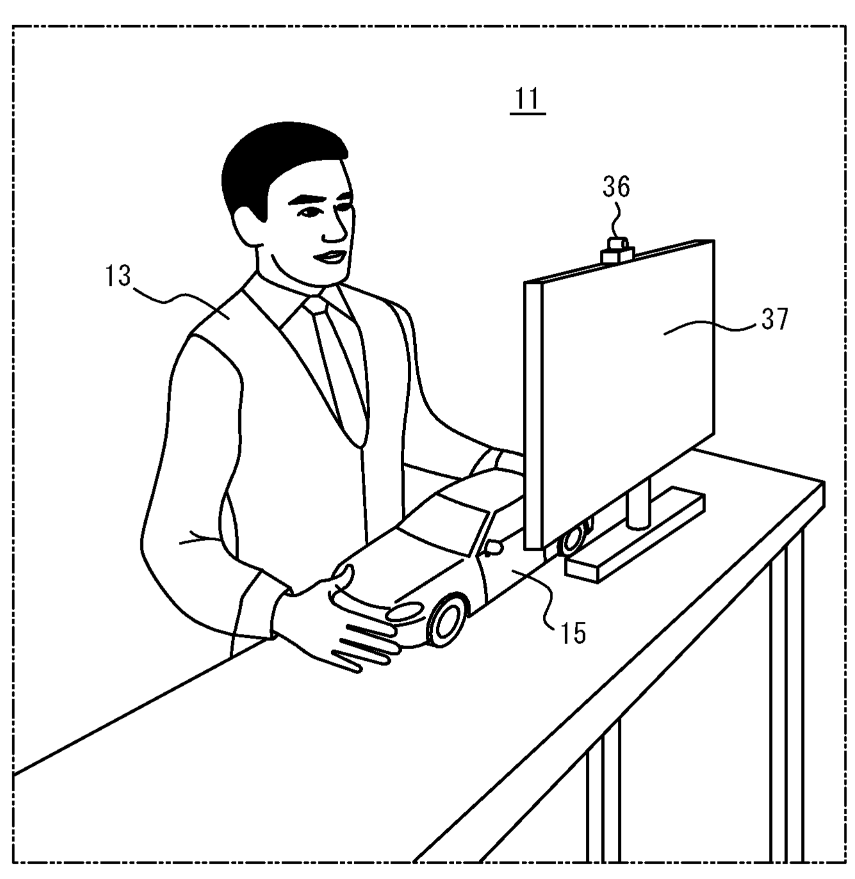
FIG. 2 is a diagram illustrating an example of a first user holding an object with both hands.
Figure 3:
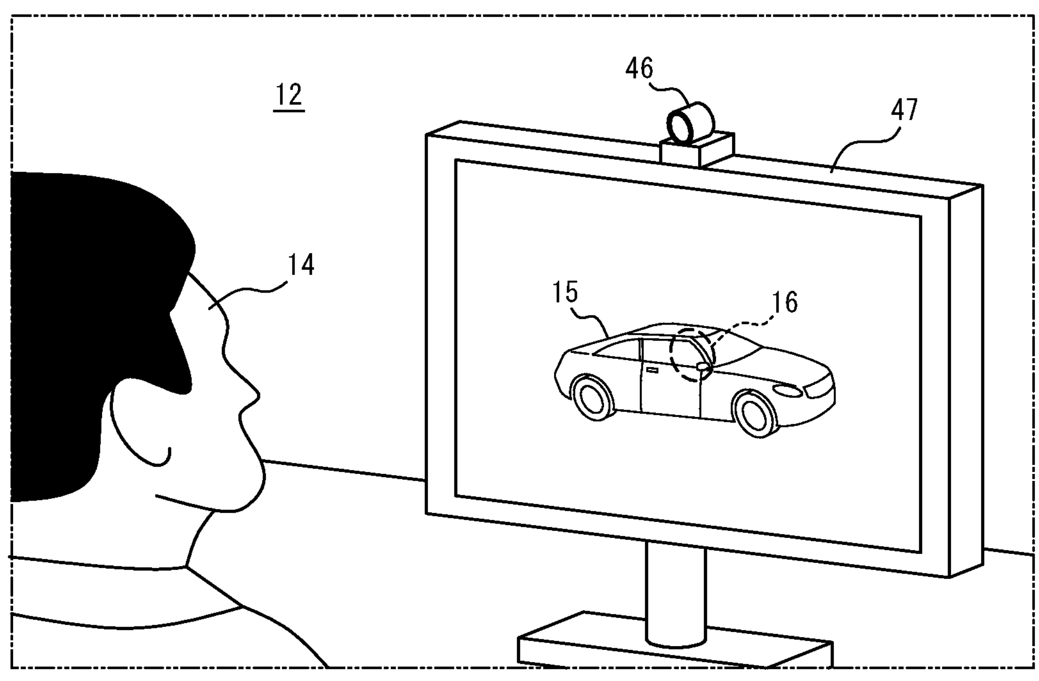
FIG. 3 is a diagram illustrating an example of a second user looking at an image of an object.

With reference to FIGS. 1 to 3, an outline of the present embodiment will be described.

The first terminal apparatus 30 is a terminal apparatus that removes the background from a first image M1 captured in the first space 11 to generate a second image M2 to be displayed to the second user 14 in the second space 12. The first terminal apparatus 30 scans an object 15 in the first space 11 upon detecting a cue from the first user 13. The first terminal apparatus 30 transmits an image M3 of the scanned object 15 together with the second image M2 via the network 50. The object 15 is not limited to a model car as illustrated in FIG. 2 but can be any tangible object, such as a memo or other document, or a food item or other product.

The second terminal apparatus 40 receives the image M3 of the object scanned by the first terminal apparatus 30 together with the second image M2 via the network 50. The second terminal apparatus 40 displays the received image M3 of the object 15 together with the second image M2 to the second user 14.

According to the present embodiment, the first user 13 can show the object 15 in front of the first user 13 to the other party while communicating by video, even when a background removal function is enabled. This can prevent the object 15 from being considered part of the background and removed when, for example, the first user 13 tries to show the object 15 in front of the first user 13 to the other party in a videoconference.

In the present embodiment, the first terminal apparatus 30 identifies the part of the object 15 on which the first user 13 is focusing. The first terminal apparatus 30 transmits focus information A1 indicating the identified part via the network 50.

The second terminal apparatus 40 receives the focus information A1 via the network 50. The second terminal apparatus 40 displays a mark 16 on the image M3 of the object 15 at a position corresponding to the part indicated by the received focus information A1.

According to the present embodiment, the first user 13 can easily tell the other party what part the first user 13 is focusing on while communicating by video. For example, when the first user 13 wants to tell the other party in a videoconference about the part of the object 15 that the first user 13 is focusing on, it is no longer necessary to write the part down.

In the example in FIG. 2, the first terminal apparatus 30 uses the camera 36 to capture video of the first space 11 including the first user 13 during a web conference as the first image M1. The first terminal apparatus 30 transmits the video obtained by removing the background from the captured video as the second image M2 to the server apparatus 20 via the network 50. The first terminal apparatus 30 receives the video of the second space 12 including the second user 14 during the web conference, or the video obtained by removing the background from the video, from the server apparatus 20 via the network 50. The first terminal apparatus 30 displays the received video on the display 37. Upon detecting a cue from the first user 13, the first terminal apparatus 30 uses the camera 36 to scan the model car on which the first user 13 is focused as the object 15 in the first space 11. For example, the first user 13 is considered to have focused on the model car in a case in which the first user 13 holds the model car in both hands, places the model car near the hands, gazes at the model car, or points to the model car. The first terminal apparatus transmits the image of the scanned model car as the image M3 of the object to the server apparatus 20 via the network 50.

The server apparatus 20 receives the video obtained by removing the background from the video of the first space 11 from the first terminal apparatus 30 via the network 50, processes the received video appropriately, and then transmits the video to the second terminal apparatus 40 via the network 50. The server apparatus 20 receives the video of the second space 12, or the video obtained by removing the background from that video, from the second terminal apparatus 40 via the network 50, processes the received video appropriately, and then transmits the video to the first terminal apparatus 30 via the network 50. Upon receiving the image of the model car from the first terminal apparatus 30 via the network 50, the server apparatus 20 processes the received image appropriately and then transmits the image to the second terminal apparatus 40 via the network 50.

In the example in FIG. 3, the second terminal apparatus 40 uses the camera 46 to capture video of the second space 12 including the second user 14 during a web conference. The second terminal apparatus 40 transmits the captured video, or the video obtained by removing the background from the captured video, to the server apparatus 20 via the network 50. The second terminal apparatus 40 receives the video obtained by removing the background from the video of the first space 11 including the first user 13 during the web conference from the server apparatus 20 via the network 50. The second terminal apparatus 40 displays the received video on the display 47. Upon receiving an image of the model car from the server apparatus 20 via the network 50, the second terminal apparatus 40 displays the received image on the display 47.

According to the examples in FIGS. 2 and 3, in a web conference, the presenter can easily display the object 15 in front of the presenter to the other party without having to perform any special operations with a web conferencing tool.

In the example in FIG. 2, the first terminal apparatus 30 uses the camera 36 to detect the facial orientation, the gaze, or the orientation of a finger of the first user to recognize the portion of the model car on which the first user 13 is focusing. The first terminal apparatus 30 notifies the server apparatus 20 via the network 50 of the portion of the model car on which the first user 13 is focusing as the focus information A1.

Upon being notified by the first terminal apparatus 30 via the network 50 of the portion of the model car on which the first user 13 is focusing, the server apparatus 20 notifies the second terminal apparatus 40 via the network 50 of the portion of the model car on which the first user 13 is focusing.

In the example in FIG. 3, upon being notified by the server apparatus via the network 50 of the portion of the model car on which the first user 13 is focusing, the second terminal apparatus 40 displays a dashed frame as a mark 16 on the image of the model car displayed on the display 47 so that the second user 14 can understand which portion of the model car the first user 13 is focusing on.

According to the examples in FIGS. 2 and 3, in a web conference, the presenter can easily allow the other party to confirm which portion of the object 15, which is shared with the other party, the presenter is describing without having to perform any special operations with a web conferencing tool.

Figure 4:
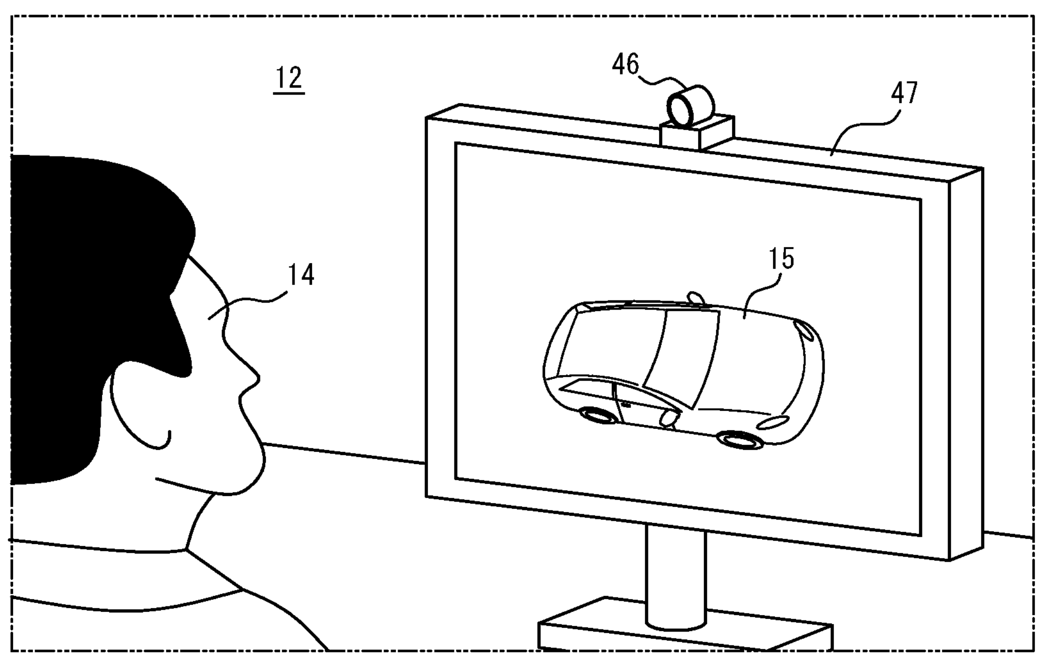
FIG. 4 is a diagram illustrating another example of the second user looking at an image of an object.

The image M3 of the object 15 can be a 2D image or a 3D image. In a case in which the image M3 of the object 15 is a 3D image, as illustrated in FIG. 4, the second terminal apparatus 40 may rotate or move the image M3 of the object 15 to display the position of the image M3 of the object 15 corresponding to the part indicated by the received focus information A1 to the second user 14. According to such a variation, even without the mark 16 being displayed, the first user 13 can easily tell the other party what part the first user 13 is focusing on while communicating by video.

In the example in FIG. 4, upon being notified by the server apparatus via the network 50 of the portion of the model car on which the first user 13 is focusing, the second terminal apparatus 40 rotates or moves the image of the model car displayed on the display 47 so that the second user 14 can see the part of the model car on which the first user 13 is focusing.

The image M3 of the object 15 scanned by the first terminal apparatus may be displayed by the first terminal apparatus 30 as well as the second terminal apparatus 40. In such a variation, the first terminal apparatus 30 displays the image M3 of the scanned object 15 to the first user 13.

For example, the first terminal apparatus 30 displays an image of the model car on the display 37.

As another variation, the first terminal apparatus 30 may identify the part of the image M3 of the object 15, displayed on the display 37, that the first user 13 is focusing on and transmit focus information A2 indicating the identified part via the network 50. In such a variation, the second terminal apparatus 40 receives the focus information A2 via the network 50. The second terminal apparatus 40 displays a mark on the image M3 of the object at a position corresponding to the part indicated by the received focus information A2. Alternatively, in a case in which the image M3 of the object is a 3D image, the second terminal apparatus 40 may rotate or move the image M3 of the object 15 to display the position of the image M3 of the object 15 corresponding to the part indicated by the received focus information A2 to the second user 14.

For example, the first terminal apparatus 30 uses the camera 36 to detect the facial orientation, the gaze, or the orientation of a finger of the first user 13 to recognize the portion in the image of the model car on which the first user 13 is focusing. The first terminal apparatus 30 notifies the server apparatus 20 via the network 50 of the portion in the image of the model car on which the first user 13 is focusing as the focus information A2.

Upon being notified by the first terminal apparatus 30 via the network 50 of the portion in the image of the model car on which the first user 13 is focusing, the server apparatus 20 notifies the second terminal apparatus 40 via the network 50 of the portion in the image of the model car on which the first user 13 is focusing.

Upon being notified by the server apparatus 20 via the network 50 of the portion in the image of the model car on which the first user 13 is focusing, the second terminal apparatus 40 displays a dashed frame as a mark on the image of the model car displayed on the display 47 so that the second user 14 can understand which portion in the image of the model car the first user 13 is focusing on. Alternatively, upon being notified by the server apparatus 20 via the network 50 of the portion in the image of the model car on which the first user 13 is focusing, the second terminal apparatus 40 may rotate or move the image of the model car displayed on the display 47 so that the second user 14 can see the part in the image of the model car on which the first user 13 is focusing.

As yet another variation, the first terminal apparatus 30 may receive focus information A3 indicating the part of the image M3 of the object 15 on which the second user 14 is focusing via the network 50 and display a mark on the image M3 of the object 15, being displayed on the display 37, at a position corresponding to the part indicated by the received focus information A3. Alternatively, in a case in which the image M3 of the object 15 is a 3D image, the first terminal apparatus 30 may receive the focus information A3 via the network 50 and rotate or move the image M3 of the object 15, being displayed on the display 37, to display the position of the image M3 of the object 15 corresponding to the part indicated by the received focus information A3 to the first user 13.

For example, the second terminal apparatus 40 uses the camera 46 to detect the facial orientation, the gaze, or the orientation of a finger of the second user 14 to recognize the portion in the image of the model car on which the second user 14 is focusing. The second terminal apparatus 40 notifies the server apparatus 20 via the network 50 of the portion in the image of the model car on which the second user 14 is focusing as the focus information A3.

Upon being notified by the second terminal apparatus 40 via the network 50 of the portion in the image of the model car on which the second user 14 is focusing, the server apparatus 20 notifies the first terminal apparatus 30 via the network 50 of the portion in the image of the model car on which the second user 14 is focusing.

Upon being notified by the server apparatus 20 via the network 50 of the portion in the image of the model car on which the second user 14 is focusing, the first terminal apparatus 30 displays a dashed frame as a mark on the image of the model car displayed on the display 37 so that the first user 13 can understand which portion in the image of the model car the second user 14 is focusing on. Alternatively, upon being notified by the server apparatus 20 via the network 50 of the portion in the image of the model car on which the second user 14 is focusing, the first terminal apparatus 30 may rotate or move the image of the model car displayed on the display 37 so that the first user 13 can see the part in the image of the model car on which the second user 14 is focusing.

According to this example, in a web conference, a participant can easily allow the other party to confirm which portion of the object 15, which is shared with the other party, the participant is looking at without having to perform any special operations with a web conferencing tool.

A configuration of the first terminal apparatus 30 according to the present embodiment will be described with reference to FIG. 1.

The first terminal apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 31 executes processes related to operations of the first terminal apparatus 30 while controlling components of the first terminal apparatus 30.

The memory 32 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compliant with a wired LAN communication standard such as Ethernet® (Ethernet is a registered trademark in Japan, other countries, or both), or an interface compliant with a wireless LAN communication standard such as IEEE802.11 or a mobile communication standard such as LTE, the 4G standard, or the 5G standard. "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 may also communicate with the second terminal apparatus 40. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with the display 37, the camera 36, LiDAR, or a microphone. "LiDAR" is an abbreviation of light detection and ranging. The camera 36 is, for example, an RGB camera or a combination of an RGB camera and a depth camera. The input interface 34 accepts an operation for inputting data to be used for the operations of the first terminal apparatus 30. The input interface 34, instead of being included in the first terminal apparatus 30, may be connected to the first terminal apparatus 30 as an external input device. As an interface for connection, for example, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 includes at least one interface for output. The interface for output is, for example, the display 37 or a speaker. The display 37 is, for example, an LCD or an organic EL display. The term "LCD" is an abbreviation of liquid crystal display. The term "EL" is an abbreviation of electro luminescence. The output interface 35 outputs data obtained by the operations of the first terminal apparatus 30. The output interface 35, instead of being included in the first terminal apparatus 30, may be connected to the first terminal apparatus 30 as an external output device. As an interface for connection, for example, an interface compliant with a standard such as USB, HDMI®, or Bluetooth® can be used.

The functions of the first terminal apparatus 30 are realized by execution of a program according to the present embodiment by a processor serving as the controller 31. That is, the functions of the first terminal apparatus 30 are realized by software. The program causes a computer to execute the operations of the first terminal apparatus 30, thereby causing the computer to function as the first terminal apparatus 30. That is, the computer executes the operations of the first terminal apparatus 30 in accordance with the program to thereby function as the first terminal apparatus 30.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the first terminal apparatus 30 may be realized by a programmable circuit or a dedicated circuit serving as the controller 31. That is, some or all of the functions of the first terminal apparatus 30 may be realized by hardware.

A configuration of the second terminal apparatus 40 according to the present embodiment will be described with reference to FIG. 1.

The second terminal apparatus 40 includes a controller 41, a memory 42, a communication interface 43, an input interface 44, and an output interface 45.

The controller 41 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 41 executes processes related to operations of the second terminal apparatus 40 while controlling components of the second terminal apparatus 40.

The memory 42 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compliant with a wired LAN communication standard such as Ethernet®, or an interface compliant with a wireless LAN communication standard such as IEEE802.11 or a mobile communication standard such as LTE, the 4G standard, or the 5G standard. The communication interface 43 communicates with the server apparatus 20. The communication interface 43 may also communicate with the first terminal apparatus 30. The communication interface 43 receives data to be used for the operations of the second terminal apparatus 40 and transmits data obtained by the operations of the second terminal apparatus 40.

The input interface 44 includes at least one interface for input. The interface for input is, for example, a physical key, a capacitive key, a pointing device, a touch screen integrally provided with the display 47, the camera 46, LiDAR, or a microphone. The camera 46 is, for example, an RGB camera or a combination of an RGB camera and a depth camera. The input interface 44 accepts an operation for inputting data to be used for the operations of the second terminal apparatus 40. The input interface 44, instead of being included in the second terminal apparatus 40, may be connected to the second terminal apparatus 40 as an external input device. As an interface for connection, for example, an interface compliant with a standard such as USB, HDMI®, or Bluetooth® can be used.

The output interface 45 includes at least one interface for output. The interface for output is, for example, the display 47 or a speaker. The display 47 is, for example, an LCD or an organic EL display. The output interface 45 outputs data obtained by the operations of the second terminal apparatus 40. The output interface 45, instead of being included in the second terminal apparatus 40, may be connected to the second terminal apparatus 40 as an external output device. As an interface for connection, for example, an interface compliant with a standard such as USB, HDMI®, or Bluetooth® can be used.

The functions of the second terminal apparatus 40 are realized by execution of a program according to the present embodiment by a processor serving as the controller 41. That is, the functions of the second terminal apparatus 40 are realized by software. The program causes a computer to execute the operations of the second terminal apparatus 40, thereby causing the computer to function as the second terminal apparatus 40. That is, the computer executes the operations of the second terminal apparatus 40 in accordance with the program to thereby function as the second terminal apparatus 40.

Some or all of the functions of the second terminal apparatus 40 may be realized by a programmable circuit or a dedicated circuit serving as the controller 41. That is, some or all of the functions of the second terminal apparatus 40 may be realized by hardware.

Operations of the communication system 10 according to the present embodiment will be described with reference to FIGS. 5 and 6. These operations correspond to a communication method according to the present embodiment.

Figure 6:
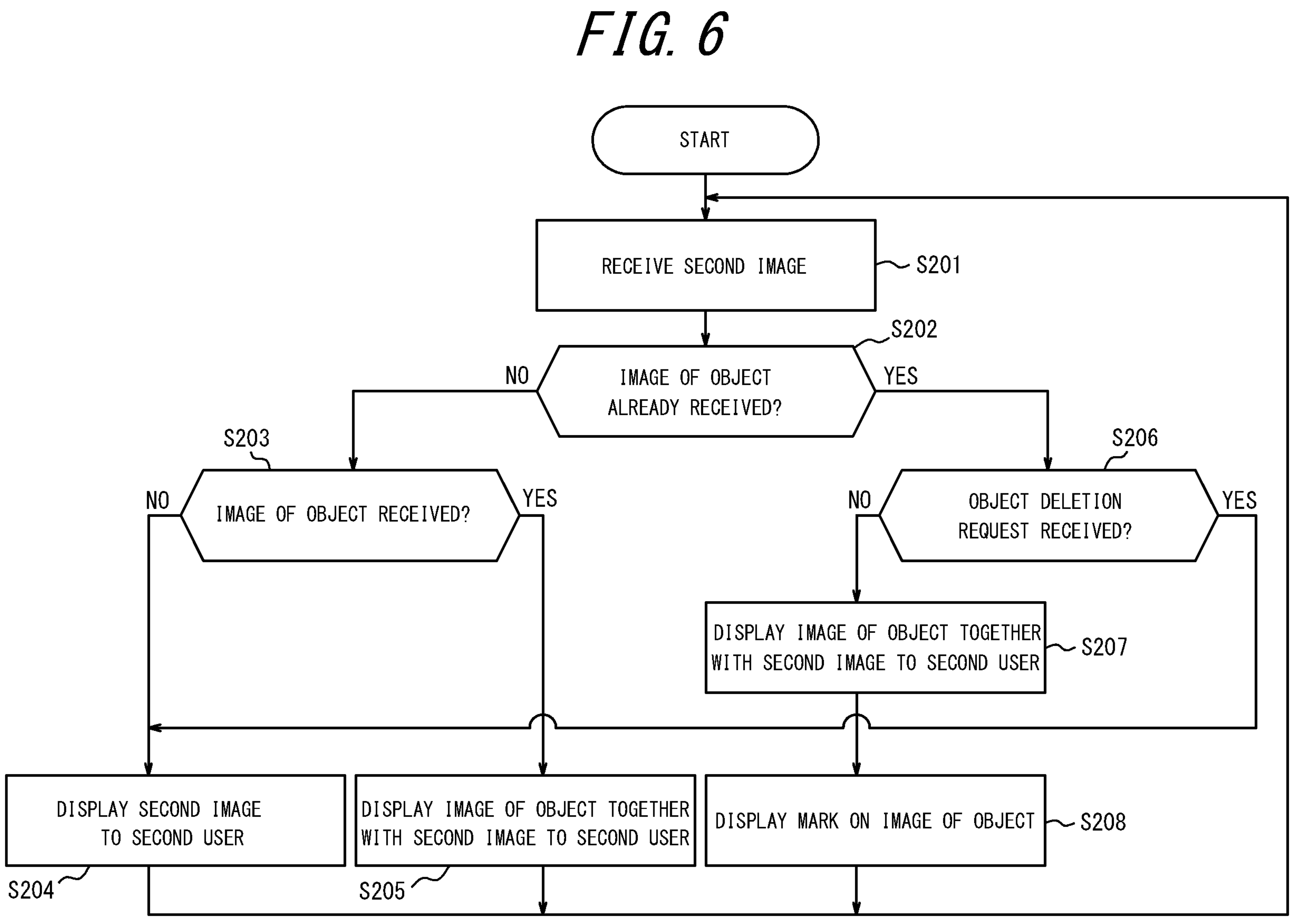
FIG. 6 is a flowchart illustrating operations of a second terminal apparatus according to the embodiment of the present disclosure.

The operations illustrated in FIGS. 5 and 6 are repeated while the first user 13 and second user 14 use the first terminal apparatus 30 and second terminal apparatus 40, respectively, for video-based communication such as web conferencing.

FIG. 5 illustrates operations of the first terminal apparatus 30.

In step S101, the controller 31 captures the first image M1 in the first space 11 using the camera 36 as the input interface 34. In step S102, the controller 31 removes the background from the first image M1 captured in step S101 to generate the second image M2. In step S103, the controller 31 determines whether the image M3 of the object 15 in the first space 11 has already been transmitted to the server apparatus 20. Specifically, the controller 31 determines that the image M3 of the object 15 has not yet been transmitted in a case in which the process in step S107 has not yet been executed, or in a case in which after the process in step S107 is executed, the process in step S111 is also executed. The controller 31 determines that the image M3 of the object 15 has already been transmitted in a case in which the process in step S111 has not yet been executed after the process in step S107 has been executed. In a case in which it is determined that the image M3 of the object 15 has not yet been transmitted, the process in step S104 is executed. In a case in which it is determined that the image M3 of the object has been transmitted, the process in step S108 is executed.

In step S104, the controller 31 can detect a cue from the first user 13 using the microphone or camera 36 as the input interface 34. This cue may include a vocal instruction by the first user 13, such as saying "look at this", or may include an instruction based on movement by the first user 13, such as picking up the object 15, turning the head in the direction of the object 15, or pointing to the object 15. The cue may be a generic pattern set in advance by the system or a unique pattern freely specified by the user. In a case in which no cue is detected, the process in step S105 is executed. In a case in which a cue is detected, the process in step S106 is executed.

In step S105, the controller 31 transmits the second image M2 generated in step S102 to the server apparatus 20 via the communication interface 33. Subsequently, the process in step S101 is executed again.

In step S106, the controller 31 scans the object 15 in the first space 11 using the camera 36 as the input interface 34. Specifically, the controller 31 detects an object held in the hand by the first user 13 as an object 15 in the first space 11 and scans the detected object. For example, the controller 31 uses the camera 36 to recognize both hands of the first user 13 and detects a tangible object, such as a model car, between the recognized hands as an object to be scanned. Alternatively, the controller 31 may detect an object for which the first user 13 is reaching as the object 15 in the first space 11 and scan the detected object. For example, the controller 31 may use the camera 36 to recognize both hands of the first user 13 and detect a tangible object, such as a model car, near the recognized hands as an object to be scanned. Alternatively, the controller 31 may detect an object at which the first user 13 is looking as the object 15 in the first space 11 and scan the detected object. For example, the controller 31 may use the camera 36 to recognize the gaze or the facial orientation of the first user 13 and detect a tangible object, such as a model car, in the direction of the recognized gaze or facial orientation as an object to be scanned. Alternatively, to avoid sharing of an unintended object, the controller 31 may detect an object that the first user 13 is holding or reaching for and is also looking at as the object 15 in the first space 11 and may scan the detected object. Alternatively, the controller 31 may detect an object at which the first user 13 is pointing as the object 15 in the first space 11 and scan the detected object. For example, the controller 31 may use the camera 36 to recognize a finger of the first user 13 and detect a tangible object, such as a model car, in the direction in which the finger is pointing as an object to be scanned. The controller 31 may prompt the first user 13 to move the object or shift the finger or hand so that a portion of the detected object that is hidden by the finger or hand of the first user 13 is also captured. In a case of detecting two or more objects, the controller 31 may ask the first user 13 which object should be scanned. In step S107, the controller 31 transmits the third image M3 of the object 15 scanned in step S106, together with the second image M2 generated in step S102, to the server apparatus 20 via the communication interface 33. Subsequently, the process in step S101 is executed again.

In step S108, the controller 31 can detect another cue from the first user 13 using the microphone or camera 36 as the input interface 34. This cue may include a vocal instruction by the first user 13, such as saying "remove this", or may include an instruction based on movement by the first user 13, such as moving the object 15 out of the angle of view of the camera 36. The cue may be a generic pattern set in advance by the system or a unique pattern freely specified by the user. In a case in which no cue is detected, the process in step S109 is executed. In a case in which a cue is detected, the process in step S111 is executed.

In step S109, the controller 31 uses the camera 36 as the input interface 34 to identify the part of the object 15 that the first user 13 is focusing on. Specifically, the controller 31 identifies the part of the object 15 that the first user 13 is looking at. For example, the controller 31 uses the camera 36 to recognize the gaze or facial orientation of the first user 13 and identify the part of the object detected in step S106 towards which the recognized gaze or face is directed. Alternatively, the controller 31 may identify the part of the object 15 at which the first user 13 is pointing. For example, the controller 31 may use the camera 36 to recognize a finger of the first user 13 and identify the part of the object detected in step S106 at which the tip of the recognized finger is pointing. In step S110, the controller 31 transmits the focus information A1 indicating the part identified in step S109, together with the second image M2 generated in step S102, to the server apparatus 20 via the communication interface 33. Subsequently, the process in step S101 is executed again.

In step S111, the controller 31 transmits an object deletion request Rq, requesting suspension of the display of the third image M3 of the object 15, together with the second image M2 generated in step S102 to the server apparatus 20 via the communication interface 33. Subsequently, the process in step S101 is executed again.

Upon receiving the second image M2 transmitted in step S105, step S107, step S110, or step S111 from the first terminal apparatus 30, the server apparatus 20 transmits the received second image M2 to the second terminal apparatus 40 after appropriate processing. For example, the server apparatus may convert the captured image of the first user 13 contained in the second image M2 into an avatar of the first user 13 in virtual 3D space before transmission to the second terminal apparatus 40. Upon receiving the image M3 of the object 15 transmitted in step S107 from the first terminal apparatus 30, the server apparatus 20 transmits the received image M3 of the object 15 to the second terminal apparatus 40 after appropriate processing. For example, the server apparatus 20 may convert the captured image as the image M3 of the object 15 into a 3D object in virtual 3D space before transmission to the second terminal apparatus 40. Upon receiving the focus information A1 transmitted in step S110 from the first terminal apparatus 30, the server apparatus 20 transmits the received focus information A1 to the second terminal apparatus 40 after appropriate processing. Upon receiving the object deletion request Rq transmitted in step S111 from the first terminal apparatus 30, the server apparatus 20 transmits the received object deletion request Rq to the second terminal apparatus 40 after appropriate processing.

FIG. 6 illustrates operations of the second terminal apparatus 40.

In step S201, the controller 41 receives the second image M2 from the server apparatus 20 via the communication interface 43. The controller 41 can receive the image M3 of the object 15, the focus information A1, or the object deletion request Rq from the server apparatus 20 via the communication interface 43 together with the second image M2. In step S202, the controller 41 determines whether the image M3 of the object 15 has already been received from the server apparatus 20. Specifically, the controller 41 determines that the image M3 of the object 15 has not been received in a case in which the image M3 of the object 15 has not yet been received, or in a case in which the object deletion request Rq has also been received after receipt of the image M3 of the object 15. The controller 41 determines that the image M3 of the object 15 has been received in a case in which the object deletion request Rq has not been received after receipt of the image M3 of the object 15. In a case in which it is determined that the image M3 of the object 15 has not yet been received, the process in step S203 is executed. In a case in which it is determined that the image M3 of the object 15 has been received, the process in step S206 is executed.

In step S203, the controller 41 determines whether the image M3 of the object 15 was received from the server apparatus 20 in step S201. In a case in which it is determined that the image M3 of the object 15 was not received, the process in step S204 is executed. In a case in which it is determined that the image M3 of the object 15 was received, the process in step S205 is executed.

In step S204, the controller 41 displays the second image M2 received in step S201 on the display 47 as the output interface 45. In other words, the controller 41 displays the second image M2 to the second user 14. Subsequently, the process in step S201 is executed again.

In step S205, the controller 41 displays the third image M3 of the object 15 received in step S201 together with the second image M2 received in step S201 on the display 47 as the output interface 45. That is, the controller 41 displays the received image M3 of the object 15 together with the second image M2 to the second user 14. Subsequently, the process in step S201 is executed again.

In step S206, the controller 41 determines whether an object deletion request Rq was received from the server apparatus 20 in step S201. In a case in which it is determined that the object deletion request Rq was not received, the process in step S207 is executed. In a case in which it is determined that the object deletion request Rq was received, the process in step S204 is executed. That is, the controller 41 suspends display of the third image M3 of the object 15 in response to the object deletion request Rq received in step S201, and in step S204, the controller 41 displays only the second image M2 received in step S201 on the display 47 as the output interface 45.

In step S207, as in step S205, the controller 41 displays the third image M3 of the object 15 received in step S201 together with the second image M2 received in step S201 on the display 47 as the output interface 45. That is, the controller 41 displays the received image M3 of the object 15 together with the second image M2 to the second user 14. In step S208, the controller 41 displays a mark 16 on the image M3 of the object 15 at a position corresponding to the part indicated by the focus information A1 received in step S201. For example, so that the second user 14 can tell which portion of a tangible object, such as the model car, the first user 13 is focusing on, the controller 41 displays a frame or mark as the mark 16 on an image of the tangible object displayed on the display 47. Subsequently, the process in step S201 is executed again.

Figure 7:
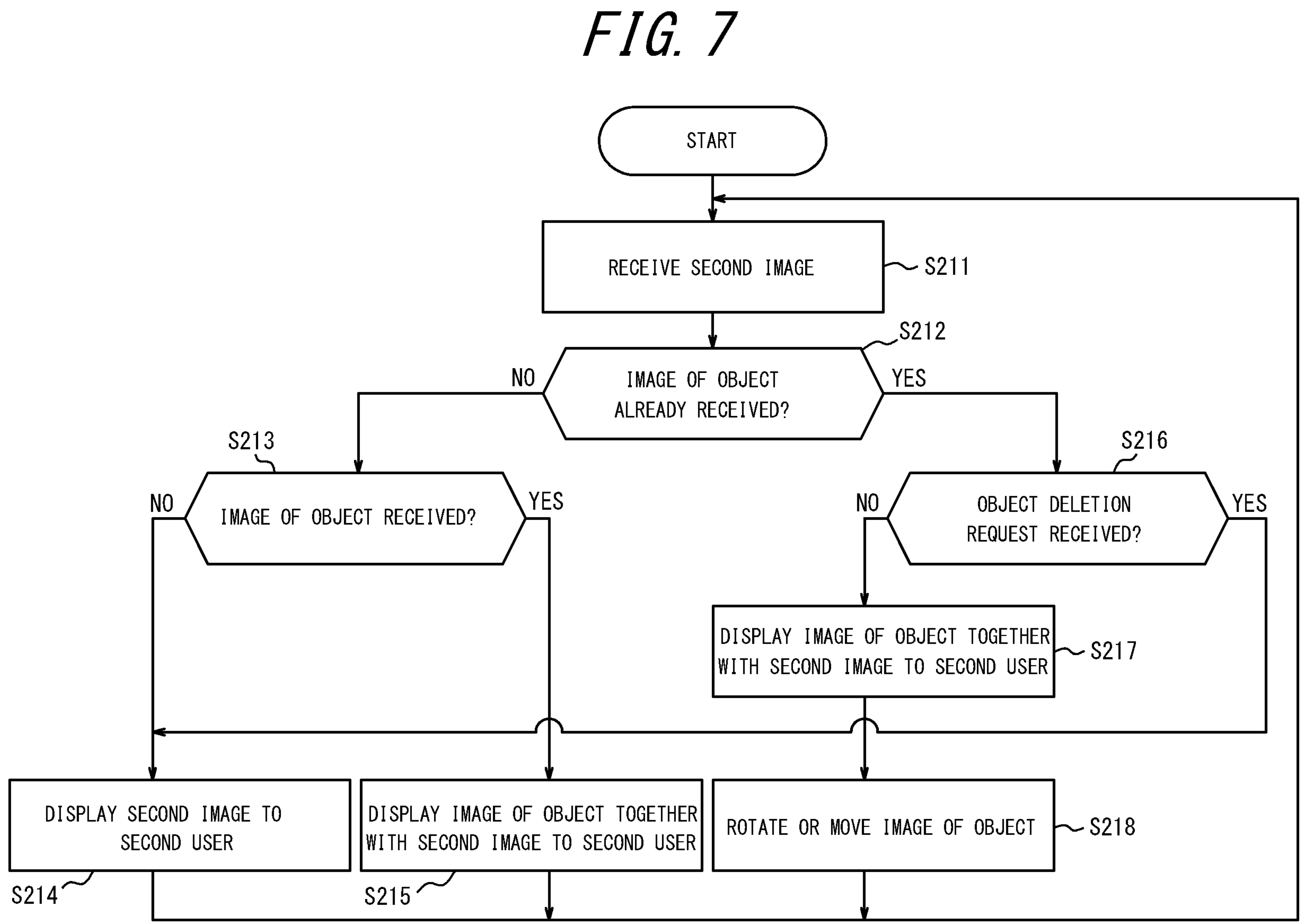
FIG. 7 is a flowchart illustrating a variation of the operations of the second terminal apparatus according to the embodiment of the present disclosure.

A variation of the operations of the second terminal apparatus 40 are now described with reference to FIG. 7. The image M3 of the object 15 is assumed to be a 3D image.

The processes in steps S211 to S217 are the same as the processes in steps S201 to S207 of FIG. 6, respectively, and thus descriptions thereof are omitted.

After step S217, in step S218, the controller 41 rotates or moves the image M3 of the object 15 to display the position of the image M3 of the object 15 corresponding to the part indicated by the focus information A1, received in step S211, to the second user 14. For example, so that the second user 14 can see the part of a tangible object, such as the model car, that the first user 13 is focusing on, the controller 41 rotates or moves the image of the tangible object displayed on the display 47. Subsequently, the process in step S211 is executed again.

The second image M2, the image M3 of the object 15, the focus information A1, and the object deletion request Rq may be transmitted from the first terminal apparatus 30 to the second terminal apparatus 40. According to such a variation, the server apparatus 20 can be omitted.

Examples of some embodiments of the present disclosure are described below. However, it should be noted that the embodiments of the present disclosure are not limited to these examples.

[Appendix 1] A program configured to cause a computer to execute operations, the computer being configured to remove a background from a first image captured in a first space in which a first user is located to generate a second image to be displayed to a second user in a second space that is separate from the first space, the operations comprising:
scanning an object in the first space upon detecting a cue from the first user; and
transmitting an image of the scanned object together with the second image via a network.

[Appendix 2] The program according to appendix 1, wherein the scanning includes detecting an object held by the first user in a hand as the object in the first space.

[Appendix 3] The program according to appendix 1, wherein the scanning includes detecting an object for which the first user is reaching as the object in the first space.

[Appendix 4] The program according to appendix 1, wherein the scanning includes detecting an object that the first user is looking at as the object in the first space.

[Appendix 5] The program according to appendix 1, wherein the scanning includes detecting an object that the first user is pointing at as the object in the first space.

[Appendix 6] The program according to any one of appendices 1 to 5, wherein the cue includes a vocal instruction by the first user.

[Appendix 7] The program according to any one of appendices 1 to 6, wherein the cue includes an instruction based on movement by the first user.

[Appendix 8] The program according to any one of appendices 1 to 7, wherein the operations further comprise:
identifying a part of the object on which the first user is focusing; and
transmitting, via the network, focus information indicating the identified part.

[Appendix 9] A program configured to cause a computer to execute operations comprising:
receiving, via a network, an image of an object scanned by a terminal apparatus together with a second image, the terminal apparatus being configured to remove a background from a first image captured in a first space in which a first user is located to generate the second image and to scan the object in the first space upon detecting a cue from the first user; and
displaying the received image of the object together with the second image to a second user in a second space that is separate from the first space.

[Appendix 10] The program according to appendix 9, wherein the operations further comprise receiving, via the network, focus information indicating a part of the object on which the first user is focusing, and the displaying includes displaying a mark on the image of the object at a position corresponding to the part indicated by the received focus information.

[Appendix 11] The program according to appendix 9, wherein the operations further comprise receiving, via the network, focus information indicating a part of the object on which the first user is focusing, the image of the object is a three-dimensional image, and the displaying includes rotating or moving the image of the object to display a position of the image of the object corresponding to the part indicated by the received focus information to the second user.

[Appendix 12] A communication method comprising:

scanning, by a terminal apparatus configured to remove a background from a first image captured in a first space in which a first user is located to generate a second image to be displayed to a second user in a second space that is separate from the first space, an object in the first space upon detecting a cue from the first user; and transmitting, from the terminal apparatus, an image of the scanned object together with the second image via a network.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A non-transitory computer readable medium storing a program configured to cause a computer to execute operations, the computer being configured to remove a background from a first image captured in a first space in which a first user is located to generate a second image to be displayed to a second user in a second space that is separate from the first space, the operations comprising:

scanning an object in the first space upon detecting a first cue from the first user;

transmitting an image of the scanned object together with the second image via a network such that the image of the scanned object and the second image are displayed together to the second user in the second space;

identifying a part of the object on which the first user is focusing;

transmitting, via the network, focus information indicating the identified part; and upon detecting a second cue from the first user, transmitting an object deletion request requesting suspension of displaying of the image of the scanned object, together with the second image via the network, wherein the second cue includes moving the object out of an angle of view of a camera by the first user.

2. The non-transitory computer readable medium according to claim 1, wherein the scanning includes detecting an object held by the first user in a hand as the object in the first space.

3. The non-transitory computer readable medium according to claim 1, wherein the scanning includes detecting an object for which the first user is reaching as the object in the first space.

4. The non-transitory computer readable medium according to claim 1, wherein the scanning includes detecting an object that the first user is looking at as the object in the first space.

5. The non-transitory computer readable medium according to claim 1, wherein the scanning includes detecting an object that the first user is pointing at as the object in the first space.

6. The non-transitory computer readable medium according to claim 1, wherein the first cue includes a vocal instruction by the first user.

7. The non-transitory computer readable medium according to claim 1, wherein the first cue includes an instruction based on movement by the first user.

8. The non-transitory computer readable medium according to claim 1, wherein the image of the scanned object is a 2D image.

9. The non-transitory computer readable medium according to claim 1, wherein the image of the scanned object is a 3D image.

10. The non-transitory computer readable medium according to claim 1, wherein the operations further comprise:

prompting the first user to move the object or shift a finger or hand of the first user so that a portion of the object that is hidden by the finger or hand of the first user is captured.

11. A communication method comprising:

scanning, by a terminal apparatus configured to remove a background from a first image captured in a first space in which a first user is located to generate a second image to be displayed to a second user in a second space that is separate from the first space, an object in the first space upon detecting a first cue from the first user;

transmitting, from the terminal apparatus, an image of the scanned object together with the second image via a network such that the image of the scanned object and the second image are displayed together to the second user in the second space;

identifying a part of the object on which the first user is focusing;

transmitting, via the network, focus information indicating the identified part; and upon detecting a second cue from the first user, transmitting an object deletion request requesting suspension of displaying of the image of the scanned object, together with the second image via the network, wherein the second cue includes moving the object out of an angle of view of a camera by the first user.

* * * * *